(12) United States Patent
Maeno

(10) Patent No.: US 9,589,333 B2
(45) Date of Patent: Mar. 7, 2017

(54) IMAGE CORRECTION APPARATUS FOR CORRECTING DISTORTION OF AN IMAGE

(71) Applicant: CASIO COMPUTER CO., LTD., Shibuya-ku, Tokyo (JP)

(72) Inventor: Yasushi Maeno, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 162 days.

(21) Appl. No.: 14/559,535

(22) Filed: Dec. 3, 2014

(65) Prior Publication Data
US 2015/0178903 A1 Jun. 25, 2015

(30) Foreign Application Priority Data

Dec. 24, 2013 (JP) .................................. 2013-265086

(51) Int. Cl.
*G06K 9/40* (2006.01)
*G06T 5/00* (2006.01)

(52) U.S. Cl.
CPC .... *G06T 5/006* (2013.01); *G06T 2207/30176* (2013.01)

(58) Field of Classification Search
CPC ........... G06T 5/001; G06T 5/006; G06T 5/20; H04N 1/4097; H04N 7/26888; G06K 9/40
See application file for complete search history.

(56) References Cited

U.S. PATENT DOCUMENTS

| | | | | |
|---|---|---|---|---|
| 5,825,466 A * | 10/1998 | Lo | ........................ | G03B 35/14 348/42 |
| 5,920,377 A * | 7/1999 | Kim | .................... | G03F 7/70241 355/30 |
| 6,236,708 B1* | 5/2001 | Lin | ........................ | A61B 6/025 378/22 |
| 7,046,839 B1* | 5/2006 | Richer | .................. | G06T 7/0042 382/154 |

(Continued)

FOREIGN PATENT DOCUMENTS

| JP | 2002150280 A | 5/2002 |
|---|---|---|
| JP | 2004228759 A | 8/2004 |

(Continued)

OTHER PUBLICATIONS

Japanese Office Action (and English translation thereof) dated Aug. 17, 2015, issued in counterpart Japanese Application No. 2013-265086.

*Primary Examiner* — Amir Alavi
(74) *Attorney, Agent, or Firm* — Holtz, Holtz & Volek PC

(57) ABSTRACT

An image correction apparatus for correcting distortion of an image, the image being obtained by photographing a subject, which is provided with a specifying unit for specifying a relationship in position between points on the subject in a three-dimensional space based on both a relationship in position between the points on the subject in the image in a two-dimensional space and a photographing angle relative to a surface of the subject, an obtaining unit for obtaining information of distortion of the image that is reflected by the relationship in position between the points on the subject in the three-dimensional space, specified by the specifying unit, and a correcting unit for correcting the distortion of the image based on the information of distortion of the image obtained by the obtaining unit.

17 Claims, 12 Drawing Sheets

(56) References Cited

U.S. PATENT DOCUMENTS

| | | | |
|---|---|---|---|
| 7,471,848 B2 | 12/2008 | Fujimoto et al. | |
| 8,189,889 B2* | 5/2012 | Pearlstein | A61B 6/583 |
| | | | 382/128 |
| 8,363,091 B2* | 1/2013 | Hoshino | G03B 35/02 |
| | | | 348/46 |
| 8,724,895 B2* | 5/2014 | Lin | G06T 3/4015 |
| | | | 348/272 |
| 9,008,460 B2* | 4/2015 | Shechtman | G06T 5/00 |
| | | | 382/103 |
| 2015/0178903 A1* | 6/2015 | Maeno | G06T 5/006 |
| | | | 382/275 |

FOREIGN PATENT DOCUMENTS

| | | |
|---|---|---|
| JP | 2005045723 A | 2/2005 |
| JP | 2010130181 A | 6/2010 |
| WO | 2005041125 A1 | 5/2005 |

* cited by examiner

IMAGE CORRECTION APPARATUS FOR CORRECTING DISTORTION OF AN IMAGE

CROSS-REFERENCE TO RELATED APPLICATION

The present application is based upon and claims the benefit of priority from the prior Japanese Patent Application No. 2013-265086, filed Dec. 24, 2013, the entire contents of which are incorporated herein by reference.

BACKGROUND OF THE INVENTION

1. Field of the Invention

The present invention relates to a technique for correcting distortion of an image of a prescribed subject obtained when the prescribed subject is photographed.

2. Description of the Related Art

When information (characters, figures and the like) written on a surface of a subject which can transform, such as a paper medium (for example, notebook and a document) is photographed and recorded as an image, an image reflected by the original shape of the subject can be obtained, when the photographed image is subjected to a trapezoidal distortion correction. In the following description, the term of "subject" is sometimes referred to as a "manuscript", but the "manuscript" means the paper medium itself to be photographed, but does not mean drafts or draft articles.

When a photographed manuscript includes three-dimensional distortions (a distortion due to a curved manuscript and local distortions due to the irregularly curved manuscript), and if the trapezoidal distortion correction is made only to the manuscript image so as to produce a corrected manuscript image, then such three-dimensional distortions will be more emphasized in the corrected manuscript image.

The technique for solving the above problem has been proposed, for example, by Japanese Unexamined Patent Publication No. 2010-130181. The technique detects a vanishing point, that is, a vertical vanishing point in the vertical direction perpendicular to text lines in the manuscript and a horizontal vanishing point in the horizontal direction perpendicular to the vertical direction of the manuscript in the manuscript image, respectively. Then, a grid is set in the manuscript image, which grid consists of plural vertical lines drawn on the basis of the vertical vanishing point and plural horizontal lines drawn on the basis of the horizontal vanishing point, whereby plural unit square areas are defined in the manuscript image by the grid. Then, a correcting process is performed on the plural unit square areas defined in the manuscript image to transform the shape of each of the unit square areas into a rectangle shape, whereby a corrected image is reproduced, which is substantially in the same state as the photographed manuscript representing character information with no three-dimensional distortion included therein.

SUMMARY OF THE INVENTION

According to one aspect of the present invention, there is provided an image correction apparatus for correcting distortion of an image, the image being obtained by photographing a subject, the apparatus which comprises a specifying unit which specifies a relationship in position between points on the subject in a three-dimensional space based on both a relationship in position between the points on the subject in the image in a two-dimensional space and a photographing angle relative to a surface of the subject, an obtaining unit which obtains information of distortion of the image that is reflected by the relationship in position between the points on the subject in the three-dimensional space, specified by the specifying unit, and a correcting unit which corrects the distortion of the image based on the information of distortion of the image obtained by the obtaining unit.

According to another aspect of the invention, there is provided a method of correcting distortion of an image, the image being obtained by photographing a subject, the method which comprises a step of specifying a relationship in position between points on the subject in a three-dimensional space, based on both a relationship in position between the points on the subject in the image in a two-dimensional space and a photographing angle relative to a surface of the subject, a step of obtaining information of distortion of the image that is reflected by the relationship in position between the points on the subject in the three-dimensional space, specified at the specifying step, and a step of correcting the distortion of the image based on the information of distortion of the image obtained at the obtaining step.

According to other aspect of the invention, there is provided a non-transitory computer-readable storage medium with an executable program stored thereon, wherein a computer is mounted on an image correction apparatus for correcting distortion of an image, the image being obtained by photographing a subject, and the program instructs the computer to function as a specifying unit which specifies a relationship in position between points on the subject in a three-dimensional space based on both a relationship in position between the points on the subject in the image in a two-dimensional space and a photographing angle relative to a surface of the subject, an obtaining unit which obtains information of distortion of the image that is reflected by the relationship in position between the points on the subject in the three-dimensional space, specified by the specifying unit, and a correcting unit which corrects the distortion of the image based on the information of distortion of the image obtained by the obtaining unit.

DETAILED DESCRIPTION OF THE PREFERRED EMBODIMENTS

Now, the preferred embodiments of the invention will be described with reference to the accompanying drawings in detail.

First Embodiment

Figure 1:
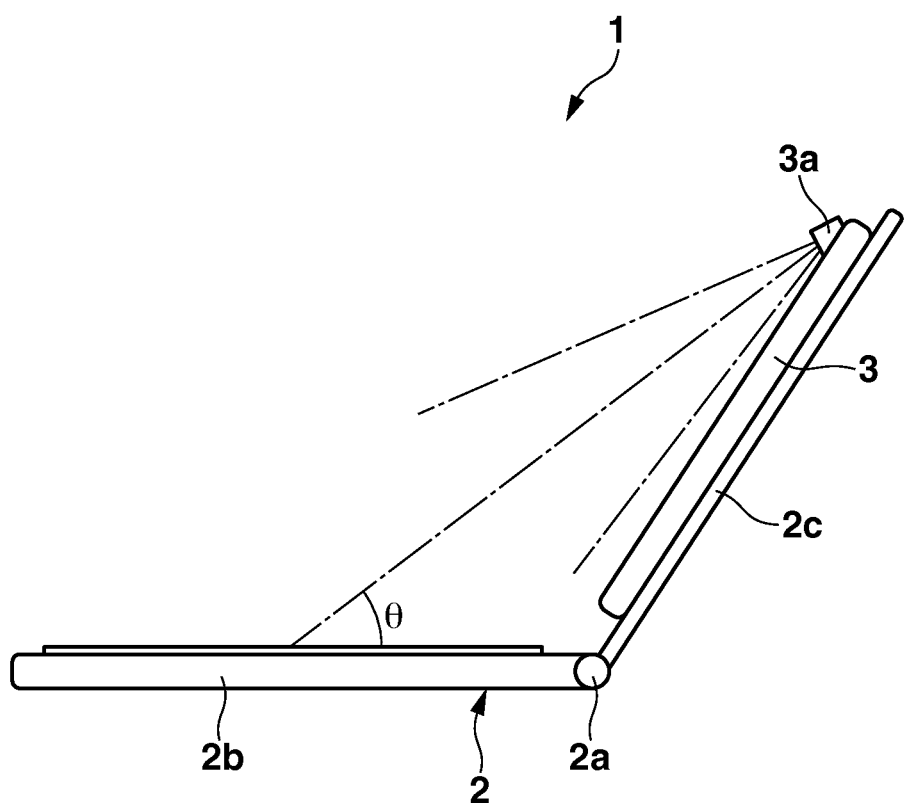
FIG. 1 is a view showing the external appearance of an image correction apparatus according the first and second embodiments of the present invention.

An image correction apparatus according the first embodiment of the present invention will be described. FIG. 1 is a view showing the external appearance of the image correction apparatus according the first and second embodiments of the present invention.

The image correction apparatus 1 mainly consists of a housing 2 and an apparatus body 3, wherein the housing 2 further consists of a first housing 2b and a second housing 2c, the first housing 2b being openably/closably connected to the second housing 2c by means of a hinge mechanism 2a, and the apparatus body 3 has a photographing function which is provided on the first housing 2b, as shown in FIG. 1.

The housing 2 can be used with the first housing 2b and the second housing 2c kept open at a given angle, as shown in FIG. 1. The housing 2 with the first and the second housings 2b, 2c held open is used as a mounting stand for a manuscript (a prescribed subject which can be transformed). Examples of the manuscript include various sorts of documents, notebooks, publications, printed matters, and the like.

The apparatus body 3 is an information processing apparatus having a camera 3a used for taking a picture of the manuscript placed on the second housing 2c, and comprises a tablet type computer and the like which is detachable to the first housing 2b.

The camera 3a is mounted on the apparatus body 3 such that the optical axis L of the camera 31 will have a defined angle against the surface of the second housing (manuscript holder) 2c, when the housing 2 is held in usage as shown in FIG. 1, whereby a manuscript placed on the second housing (manuscript holder) 2c can be photographed by the camera 3a. When the manuscript on the second housing (manuscript holder) 2c is photographed, a photographing distance between the camera 3a and the manuscript, and a photographing angle θ or an angle for taking a picture are fixed. The camera 3a has an angle of view to photograph the whole surface of the second housing 2c.

Figure 2:
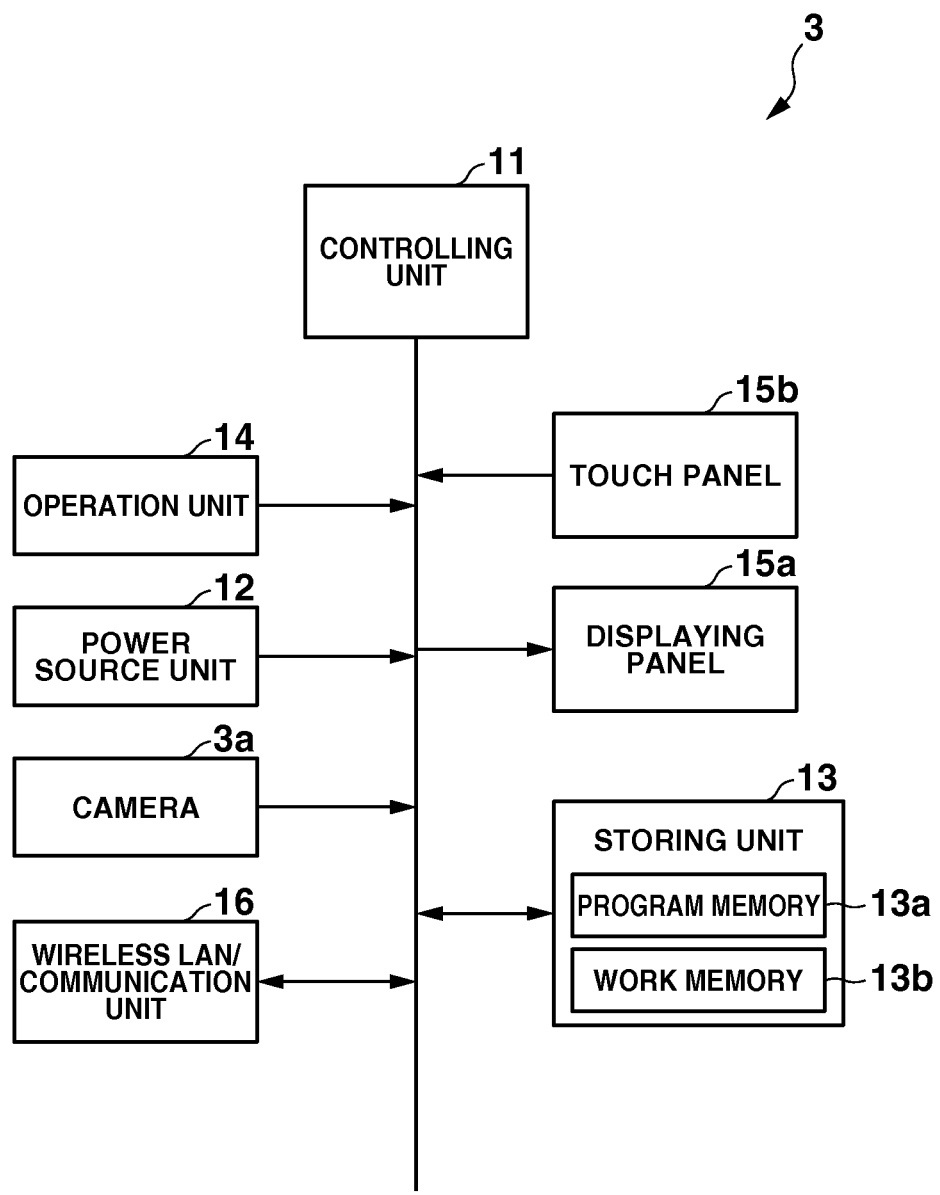
FIG. 2 is a block diagram of an electric configuration of the apparatus body according to the embodiment of the invention.

FIG. 2 is a block diagram of an electric configuration of the apparatus body 3 according to the embodiment of the invention. The camera 3a comprises an imaging device of CCD (Charge Coupled Device) or CMOS (Complementary Metal Oxide Semiconductor) for imaging a subject through an imaging optical system (not shown) and an image processing engine for processing an image signal obtained by the imaging device. Image data of the subject produced by the camera 3a is sent to a controlling unit 11.

The controlling unit 11 is supplied with electric power from a power source unit (secondary battery) 12, and controls the whole operation of the apparatus body 3 in accordance with various programs stored in a storing unit 13. The controlling unit 11 comprises CPU (Central Processing Unit), its peripheral circuits, and a memory. 1.

The storing unit 13, for example, comprises a flash memory, and has a program memory 13a for storing the various programs and a work memory 13b for storing various sorts of information including the image data produced by the camera 3a. A recording medium detachable to the apparatus body 3 can be used as the storing unit 13.

An operation unit 14 comprises plural operation switches including a power source key (not shown). A displaying panel 15a consists of a liquid displaying device for displaying various sorts of image information and character information.

A touch panel 15b is an input device of an electrostatic capacitance system or of a resistance film system, which detects a position where operation is performed by a user with the finger(s) to obtain coordinate data of the detected position, and then supplies the coordinate data to the controlling unit 11.

A communication unit 16 is a wireless communication module which is capable of communication of a large scale capacity at a high speed. The communication unit 16 connects with the Internet through a near-by wireless LAN (Local Area Network) router and/or exchanges data with other devices having a communication function such as personal computers.

In the image correction apparatus 1 having the above configuration, the controlling unit 11 performs an image correction process in accordance with a predetermined program stored in the program memory 13a to correct or adjust manuscript distortion included in the image ("manuscript image") photographed by the camera 3a.

Figure 3:
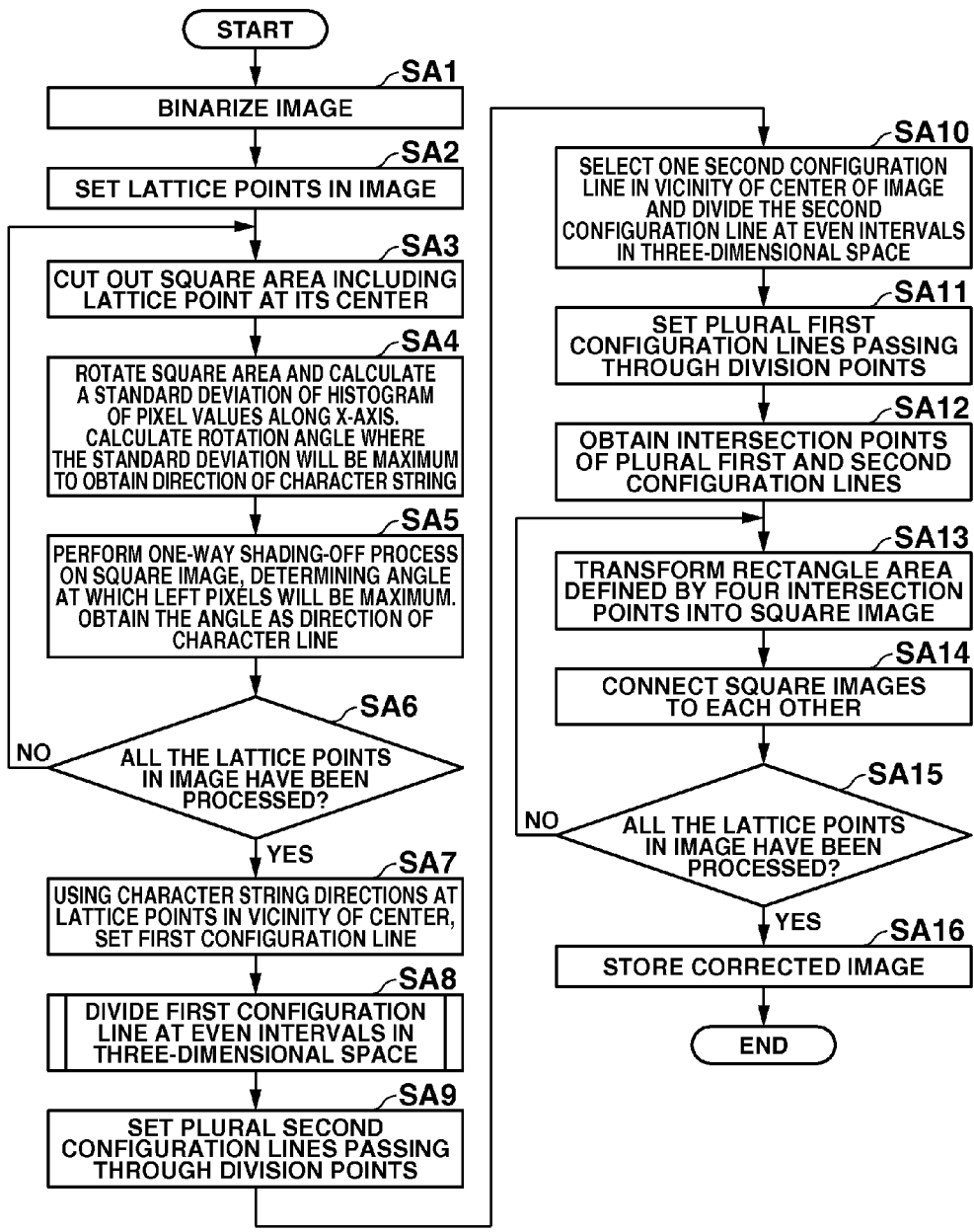
FIG. 3 is a flow chart of an image correction process performed by a controlling unit of the apparatus body according to the embodiment of the invention.
Figure 4:
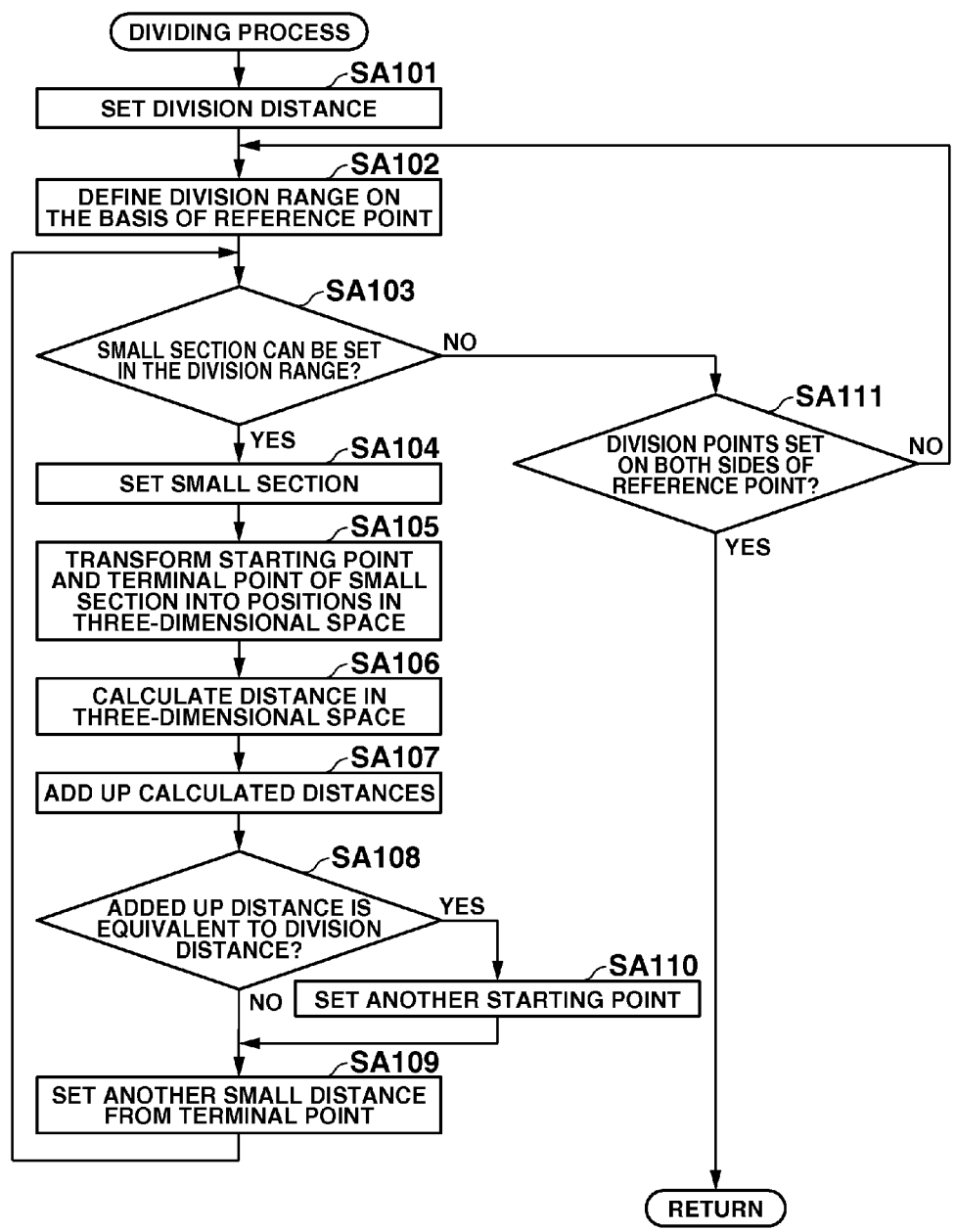
FIG. 4 is a flow chart of the dividing process performed by the controlling unit of the apparatus body according to the embodiment of the invention.

FIG. 3 and FIG. 4 are flow charts of the image correction process performed by the controlling unit 11 of the apparatus body 3. The following description will be given on the premise that the manuscript is a document on which characters are written and/or printed.

In the image correction process, the controlling unit 11 binarizes the manuscript image of the manuscript photographed by the camera 3a and stored in the work memory 13b (step SA1).

Figure 5A:
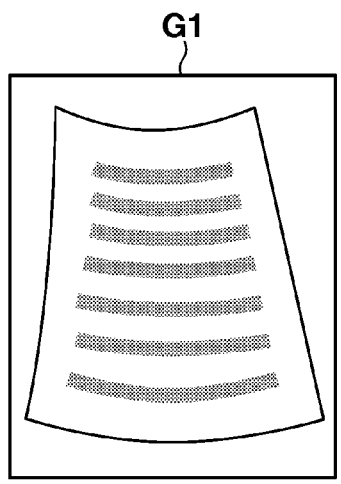
FIG. 5A, FIG. 5B, FIG. 5C, and FIG. 5D, and FIG. 5E are views showing contents of an image correction process performed in the first embodiment of the invention.

In the binarization, known Niblack method, which sets separate thresholds respectively for parts different in brightness level, is used to obtain a binarized image in which characters and a background are clearly separated. FIG. 5A is a view showing the binarized image G1 for convenience, in which image G1 plural character strings each extend substantially laterally. In the following description, it is premised that character strings extend substantially laterally in the image.

Figure 5B:
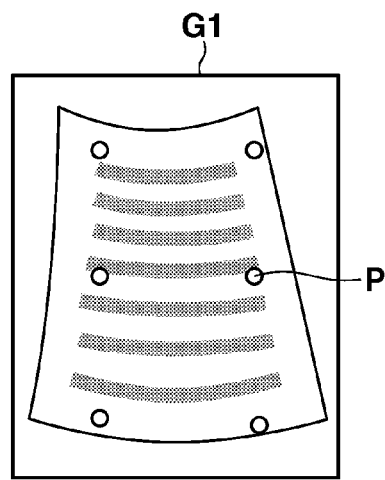

Then, the controlling unit 11 sets lattice points at plural positions in the binarized image G1 (step SA2). More specifically, the controlling unit 11 detects edges in the binarized image G1 to discriminate text areas where characters line up from other areas, and sets plural lattice points "P" in the text areas at given intervals. FIG. 5B is a view showing the binarized image G1 in which plural lattice points "P" (white circles) are set, for convenience.

Figure 5C:
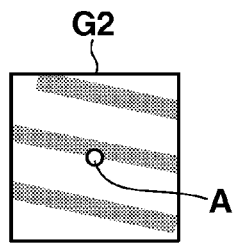

From the binarized image G1, the controlling unit 11 successively cuts out squares (area image) of a given size, each including the lattice point "P" at its center (step SA3). FIG. 5C is a view showing the area image G2 cut out from the binarized image G1.

The controlling unit 11 repeatedly rotates the area image G2 to calculate a standard deviation of a histogram of pixel values along the direction of X-axis, and further calculates a rotation angle of the area image G2 where the calculated standard deviation will be maximum in the histogram of pixel values. The direction of the rotation angle of the area image G2, in which the character string runs passing through the lattice point "P", is referred to as a local "character string direction" (step SA4).

Figure 5D:
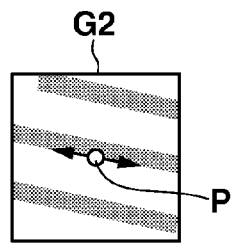

The histogram of pixel values in the direction of X-axis represents a distribution of the total numbers of black pixels respectively on the Y-axes intersecting the X-axis at positions along the X-axis in an image space. The controlling unit 11 stores a specific rotation angle at which the standard deviation of the histogram will be maximum, that is, the angle of the area image G2 against the direction of X-axis, as information indicating the character string direction. FIG. 5D is a view showing the concept of the local character string direction indicated by an arrow in the area image G2.

Further, the controlling unit 11 uses an one-way shading-off filter to repeatedly perform a shading-off process on the area image G2, and sets a specific direction in which the total number of pixels will be maximum after the shading-off process as a local "character line direction" at the lattice point "P" (step SA5).

Figure 5E:
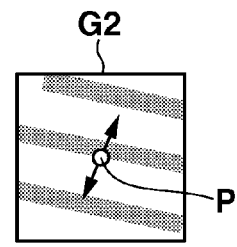

More specifically, the controlling unit 11 repeatedly applies the one-way shading-off filter on the area image G2 while changing the filtering direction, performing a process for leaving only segment lines of some extra length or longer. Then, the controlling unit 11 stores an angle measured between the specific direction (excepting the character string direction) in which the total number of black pixels left after subjected to the filtering process will be maximum and the direction of X-axis, as information representing the character line direction. FIG. 5E is a view showing the concept of the local character line direction indicated by an arrow in the area image G2.

Hereafter, the controlling unit 11 repeatedly performs the processes at steps SA3 to SA5 with respect to all the lattice points "P" set in the binarized image G1 to obtain angles of the local character string directions against the direction of X-axis and also angles of the local character line directions against the direction of X-axis, respectively at the all lattice points "P" set in the binarized image G1 (step SA6).

Figure 6A:
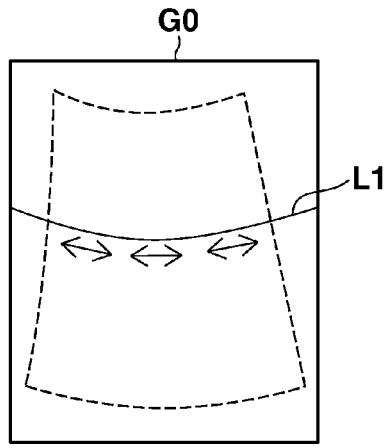
FIG. 6A, FIG. 6B, FIG. 6C, FIG. 6D, FIG. 6E, and FIG. 6F are views showing contents of the image correction process performed in the first embodiment of the invention.

When the angles of the character string directions and the angles of the character line directions respectively at all the lattice points P have been obtained (YES at step SA6), using the character string directions at the lattice points in the vicinity of the center of the manuscript image G0, the controlling unit 11 sets a first configuration line L1, as shown in FIG. 6A (step SA7). The first configuration line L1 is used as a reference line.

When setting the first configuration line L1, the controlling unit 11 complements the character string directions (angles) at points set among the lattice points P in the image based on the character string directions (angles) at the respective lattice points P. When complementing the character string directions (angles), the controlling unit 11 compares the character string directions (angles) at the lattice points P set in the neighborhood, and removes the lattice point at which the character string direction (angle) is greatly different from other, whereby conformity is secured such that the character string directions (angles) at the remaining lattice points P will vary smoothly as a whole.

Then, the controlling unit 11 selects a point locating in the vicinity of the center of the manuscript image G0, from among the lattice points P and other points locating between said lattice points and determines the selected point as a reference point. And then the controlling unit 11 extends line segments from the reference point by a small distance respectively to one side and to the other side of the character string direction at the reference point, and further extends the head of the line segment by a small distance toward the character string direction at another point placed at the corresponding position and repeatedly performs the same processes, thereby generating the first configuration line L1.

Further, the controlling unit 11 performs a dividing process to divide the first configuration line L1 into plural sections separated at even intervals in a three-dimensional space (step SA8). FIG. 4 is a flow chart of the dividing process performed by the controlling unit 11.

Figure 6B:
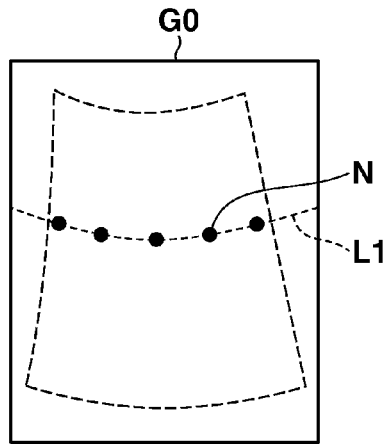

Now, the dividing process will be described briefly. In the dividing process, plural division points N separated from each other by division distances defined in the three-dimensional space, are the first configuration line L1, as shown in FIG. 6B, and the coordinates of the respective division points N are stored in the storing unit 13. In FIG. 6B, the division points N are shown for convenience, and the number of division points N is several tens, that is, the first configuration line L1 is divided into several tens of line segments.

When setting the division points N, the controlling unit 11 successively sets a small section between two adjacent points on the first configuration line L1, as will be described later, and repeatedly obtains a distance of the small section in the three-dimensional space to determine the positions of the respective division points N. The distance of the small section in the three-dimensional space is obtained based on the following idea.

Figure 8A:
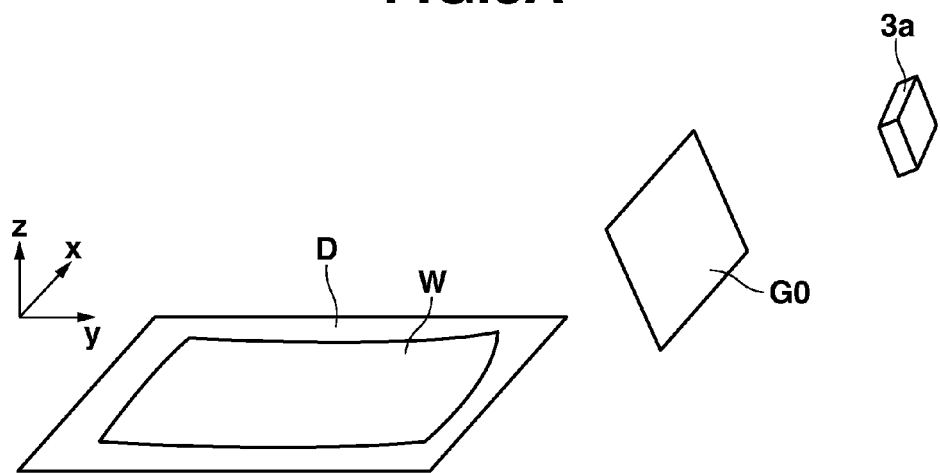
FIG. 8A, FIG. 8B, FIG. 9A, and FIG. 9B are views for explaining a method of obtaining a distance between two adjacent points on a manuscript in a three-dimensional space.
Figure 8B:
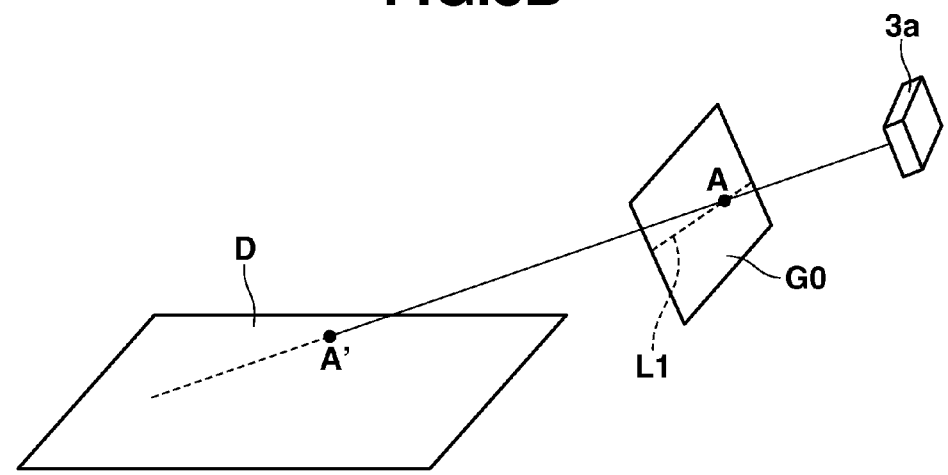

FIGS. 8A and 8B are views for explaining a method of obtaining a distance between two adjacent points in a manuscript in the three-dimensional space. A manuscript W is placed on the top plane surface D of the manuscript holder, as shown in FIG. 8A, and it is assumed that the direction of the normal line of the top plane surface D is indicated by Z-axis, the longitudinal direction of the manuscript W is indicated by X-axis, and the lateral direction of the manuscript W is indicated by Y-axis.

Since the position of a point A on the first configuration line L1 of the manuscript image G0 in the three-dimensional space approximates to a position A' on the top plane surface D, the position A' (intersection point) where the straight line passing through the camera 3a and the point A intersects with the top plane surface D will be a position of the point A in the three-dimensional space, as shown in FIG. 8B.

Figure 9A:
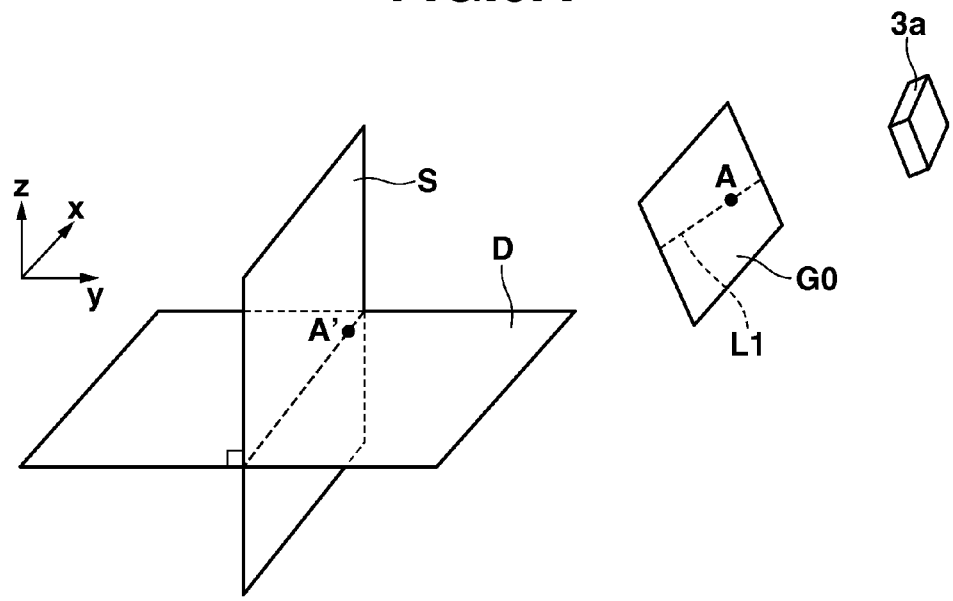

Further, if the character string direction (extending direction of the first configuration line L1) approximately coincides with the direction of X-axis, it can be considered that the first configuration line L1 passing through the point A' in the three-dimensional space is included in a vertical plane S which is perpendicular to the plane D, parallel to X-axis, and perpendicular to Y-axis in the vicinity of the point A', as shown in FIG. 9A. But if the character string direction approximately coincides with the direction of Y-axis, the vertical plane S will be parallel with Y-axis.

Figure 9B:
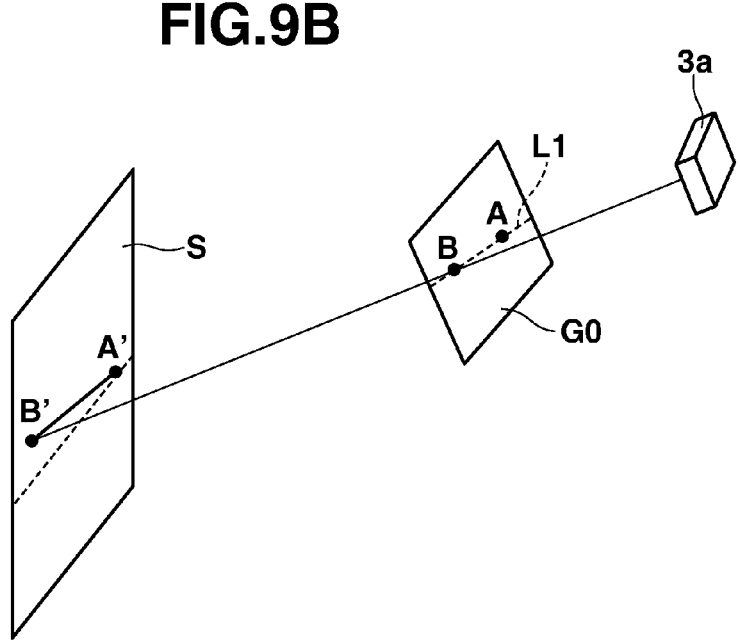

Therefore, it can be considered that a point B separating from the point A by a small distance on the first configuration line L1 in the manuscript image G0 will be at a point B' where the straight line passing through the camera 3a and the point B intersects with the vertical plane S in the three-dimensional space, as shown in FIG. 9B.

Accordingly, the distance of a line section "A'-B'" on the vertical plane S will be the distance of the small section "A-B" on the first configuration line L1 in the three-dimensional space, and this distance will be maximum when there is no distortion of the image such as curvature of the corresponding portion of the surface of the manuscript W. The distance will be smaller than the maximum, when there is distortion of the image. The larger the distortion is, the smaller the distance will be.

From the above relationship between the distance and the distortion of the image, the controlling unit 11 repeatedly obtains the distance of the line section "A'-B'" on the vertical plane "S" to set the division points. In other words, presuming that a moving direction of each point on the manuscript "W" due to curvature of the surface of the manuscript "W" in the three-dimensional space is a specific direction, that is, the direction which is parallel to the vertical plane S, the controlling unit 11 repeatedly obtains the distance of the small section "A-B" in the three-dimensional space, thereby determining the positions of the division points N on the first configuration line L1.

The dividing process will be specifically described with reference to the flow chart of FIG. 4.

In the dividing process, the controlling unit 11 sets the division distance (step SA101). Since it has been premised that the first configuration line L1 extends substantially in the lateral direction of the manuscript image G0, the division distance is a defined width "w" in the manuscript W. When the first configuration line L1 extends substantially in the longitudinal direction of the manuscript image G0, the division distance will be a defined height "h" in the manuscript W.

Then, the controlling unit 11 sets the reference point, which was used to set the first configuration line L1, as a point from which a distance is calculated, and defines a division range (step SA102). The division range is a range on the first configuration line L1 within which the division points are set. At the first stage in the dividing process, the division range is set only on one side of the reference point.

The controlling unit 11 judges whether a small section can be set in the division range defined on the one side of the reference point (step SA103). Since it is possible to set a small section in the division range at the first stage of the dividing process (YES at step SA103), the controlling unit 11 sets the small section starting from the starting point for the distance measurement (step SA104).

The controlling unit 11 transforms the coordinates of the starting point and the terminal point of the set small section in two-dimensional space (image space) into positions in the three-dimensional space (step SA105). The transformation method is as follows.

Figure 10:
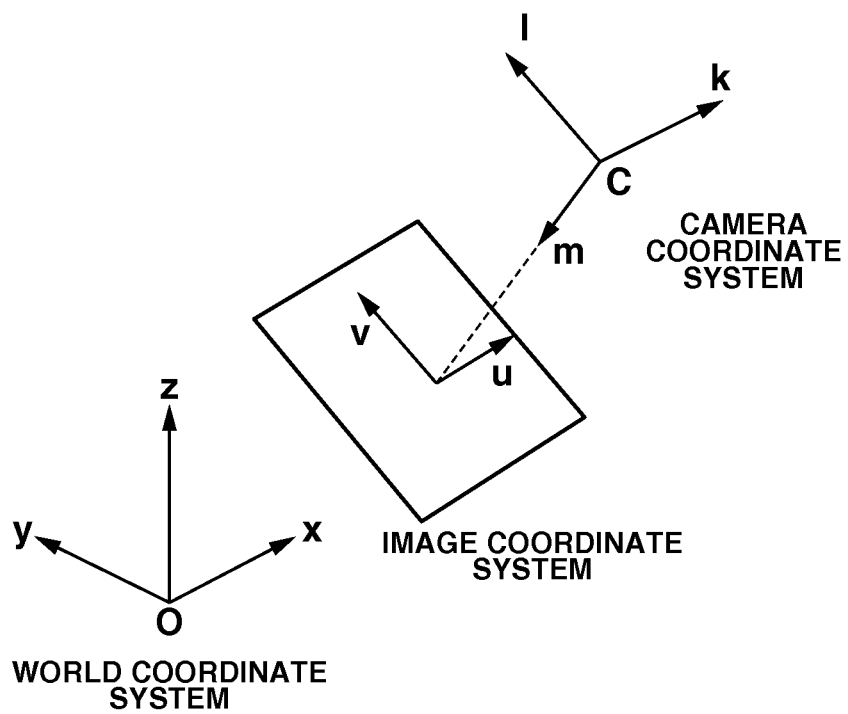
FIG. 10 is a view showing relationship between a camera coordinate system, a world coordinate system, and an image coordinate system.

As shown in FIG. 10, a camera coordinate system [k, l, m], a world coordinate system [x, y, z], and an image coordinate system [u, v] are defined. On the premise that the origin O and x- and y-axes of the world coordinate system [x, y, z] are on the surface of the manuscript holder as described above, it is assumed that the lateral direction of the manuscript is indicated by the direction of x-axis and the longitudinal direction is indicated by the direction of y-axis. The l-axis of the camera coordinate system corresponds to the perpendicular direction of the camera 3a and the m-axis corresponds to the optical axis of the camera 3a. The u-axis of the image coordinate system is parallel to the k-axis of the camera coordinate system and the v-axis is parallel to the l-axis of the camera coordinate system.

The transformation between the world coordinate system [x, y, z] and the camera coordinate system [k, l, m] is given by the following formula (1) including a rotation matrix T and a translation matrix T.

Formula (1)

$$\begin{bmatrix} x \\ y \\ z \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} k \\ l \\ m \end{bmatrix} + \begin{bmatrix} t_1 \\ t_2 \\ t_3 \end{bmatrix} \quad (1)$$

$$= \begin{bmatrix} R_1 \\ R_2 \\ R_3 \end{bmatrix} \begin{bmatrix} k \\ l \\ m \end{bmatrix} + T$$

$$= R \begin{bmatrix} k \\ l \\ m \end{bmatrix} + T$$

The rotation matrix R contains parameters indicating a posture of the camera 3a in the world coordinate system, that is, indicating a rotation of the camera 3a about the k-axis corresponding to the photographing angle of the manuscript. The translation matrix T consists of parameters indicating a position of the camera 3a in the world coordinate system, that is, indicating the photographing distance.

The transformation between the camera coordinate system [k, l, m] and the image coordinate system [u, v] is given by the following formula (2).

Formula (2)

$$\begin{bmatrix} u \\ v \end{bmatrix} = \frac{f}{m} \begin{bmatrix} k \\ l \end{bmatrix} \quad (2)$$

A vector indicating the straight line CA passing through the starting point A [Au, Av]$^t$ on the manuscript image G0 and the origin C of the camera coordinate system will be RA in the world coordinate system in accordance with the formula (1), since A=[Au, Av, f]$^t$ in the camera coordinate system. Expressing the parameters by "s", we obtain the straight line CA by the following formula (3).

Formula (3)

$$\begin{bmatrix} x \\ y \\ z \end{bmatrix} = RAs + T = \begin{bmatrix} R_1 \cdot A \\ R_2 \cdot A \\ R_3 \cdot A \end{bmatrix} s + T \quad (3)$$

Substituting z=0 into the formula (3), we obtain the following formula (4).

Formula (4)

$$s = -\frac{t_3}{R_3 \cdot A} \quad (4)$$

Using the formulas (3) and (4), we can calculate the position of the intersection point A' where the straight line AC intersects with the vertical plane S (z=0), that is, the position of the starting point A on the manuscript image G0 in the three-dimensional space from the following formula (5).

Formula (5)

$$\begin{bmatrix} x \\ y \\ z \end{bmatrix} = -\frac{t_3}{R_3 \cdot A} \begin{bmatrix} R_1 \cdot A \\ R_2 \cdot A \\ R_3 \cdot A \end{bmatrix} + T \quad (5)$$

Meanwhile, a straight line CB passing through the terminal point B on the first configuration line L1 and the origin C of the camera coordinate system will be represented by the following formula (6), which is similar to the formula (3), wherein the terminal point B is close to the starting point A on the first configuration line L1.

Formula (6)

$$\begin{bmatrix} x \\ y \\ z \end{bmatrix} = RBs + T = \begin{bmatrix} R_1 \cdot B \\ R_2 \cdot B \\ R_3 \cdot B \end{bmatrix} s + T \quad (6)$$

Calculating the formula (5), the vertical plane S including the intersection point A' and perpendicular to y-axis will be given by the following formula (7).

Formula (7)

$$y = -\frac{R_2 \cdot A}{R_3 \cdot A} t_3 + t_2 \quad (7)$$

Substituting the above formula (7) into the formula (6), we obtain the following formula (8).

Formula (8)

$$s = -\frac{R_2 \cdot A t_3}{(R_3 \cdot A)(R_2 \cdot B)} \quad (8)$$

The position of the terminal point B' where the straight line CB intersects with the vertical plane S (z=0), that is, the position of the terminal point B on the manuscript image G0 in the three-dimensional space, can be calculated from the following formula (9).

Formula (9)

$$\begin{bmatrix} x \\ y \\ z \end{bmatrix} = -\frac{R_2 \cdot A t_3}{(R_3 \cdot A)(R_2 \cdot B)} \begin{bmatrix} R_1 \cdot B \\ R_2 \cdot B \\ R_3 \cdot B \end{bmatrix} + T \quad (9)$$

At the process of step SA105 in FIG. 4, using the formulas (5) and (9), the controlling unit 11 transforms the coordinate positions of the starting point A and the terminal point B of the small section in the two-dimensional space (image space) into positions (positions of the intersection point A' and terminal point B') in the three-dimensional space.

Further, from the positions of the starting point A and the terminal point B of the small section in the three-dimensional space, the controlling unit 11 calculates the distance of the small section in the three-dimensional space (step SA106).

The controlling unit 11 adds up the calculated distances of the small sections to calculate the total distance from the starting point of measurement to the terminal point of the small section (step SA107). Then, the controlling unit 11 judges whether the total distance calculated above is equivalent to the division distance (step SA108). When the difference between the calculated distance and the division distance is a threshold or less, the controlling unit 11 determines that the calculated distance is equivalent to the division distance (YES at step SA108).

When it is determined that the calculated distance is not equivalent to the division distance (NO at step SA108), the controlling unit 11 sets a new starting point of a small section at the terminal point of the previously set small section (step SA109), and returns to step SA103, setting a new small section and repeatedly performing the above processes.

When the controlling unit 11 determines that the calculated total distance has become equivalent to the division distance (YES at step SA108) while repeatedly performing the processes at steps SA103 to SA108, then the controlling unit 11 sets the terminal point of the small section of that time as the division point and stores the coordinate position of the division point, setting the division point as a new starting point for measurement (step SA110).

Having set the terminal point of the small section as the starting point of a new small section (step SA109), the controlling unit 11 returns to step SA103, setting a new small section and repeatedly performing the above processes, thereby setting plural division points in the division range on the one side of the reference point on the first configuration line L1.

While repeatedly performing the processes at steps SA103 to SA109, when the range for setting a new small section has reached the end on the one side of the reference point of the first configuration line L1 and no small section can be set (NO at step SA103), and further if the division points have not been set on the both sides of the reference point (NO at step SA111), the controlling unit 11 returns to step SA102 once to repeatedly perform the above processes.

In other words, the controlling unit 11 sets the reference point at the starting point for measurement, again, and defines the division range for setting the division points, on the other side of the reference point (step SA102), and then repeatedly performs the process at step SA103 and the following processes, thereby setting plural division points in the range defined on the other side of the reference point.

When plural division points have been set in the range on the other side of the reference point (NO at step SA103 and YES at step SA111), the controlling unit 11 finishes the dividing process and returns to the process shown in the flow chart of FIG. 3.

Figure 6C:
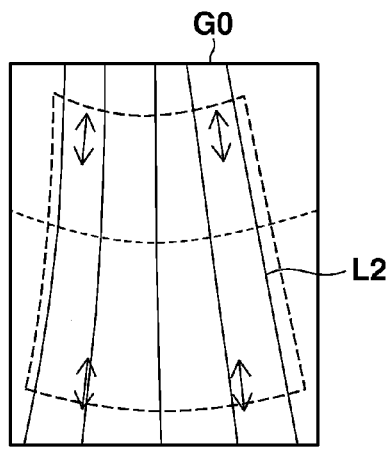

After the first configuration line L1 have been divided into plural sections at even intervals in the three-dimensional space in the dividing process, the controlling unit 11 uses the local character line directions at the lattice points P set at step SA5 in FIG. 5 to set in the manuscript image G0 plural second configuration lines L2 passing through the division points N on the first configuration line L1, as shown in FIG. 6C (step SA9).

When setting the second configuration lines L2, the controlling unit 11 uses the same method as setting the first configuration line L1 as the reference. That is, the controlling unit 11 complements the character line directions (angles) at points set among the lattice points P based on the local character line directions (angles) at the respective lattice points P. Further, the controlling unit 11 repeatedly extends line segments by a small distance from the division points (starting points) on the first configuration line L1 to one side direction and also to the other side direction, thereby generating plural second configuration lines L2.

The controlling unit 11 selects one of the plural second configuration lines L2 which positions in the vicinity of the center of the manuscript image G0, as the reference line, and divides the selected second configuration line L2 into plural sections at even intervals in the three-dimensional space, in a like manner used at step SA8 (step SA10).

Figure 6D:
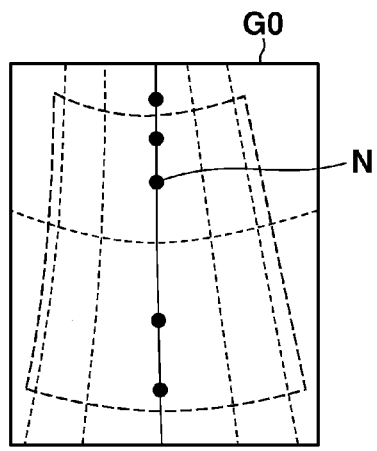

More specifically, as shown in FIG. 6D, the controlling unit 11 successively sets plural division points N separated from each other by given distances on the second configuration line L2 selected as the reference line along the one side direction and the other side direction of the division point N on the first configuration line L1 in the three-dimensional space.

When setting the division points, the controlling unit 11 successively sets a small section between the two adjacent points (starting and terminal points) on the second configuration line L2, and repeatedly obtains a distance of the small section in the three-dimensional space, thereby determining the positions of the division points.

When obtaining the distance of the small section in the three-dimensional space, the controlling unit 11 transforms the terminal point B of the small section in the two-dimensional space into the position (position of the terminal point B') in the three-dimensional space by the following formula (10).

Formula (10)

$$\begin{bmatrix} x \\ y \\ z \end{bmatrix} = -\frac{R_1 \cdot At_3}{(R_3 \cdot A)(R_1 \cdot B)} \begin{bmatrix} R_1 \cdot B \\ R_2 \cdot B \\ R_3 \cdot B \end{bmatrix} + T \quad (10)$$

Figure 6E:
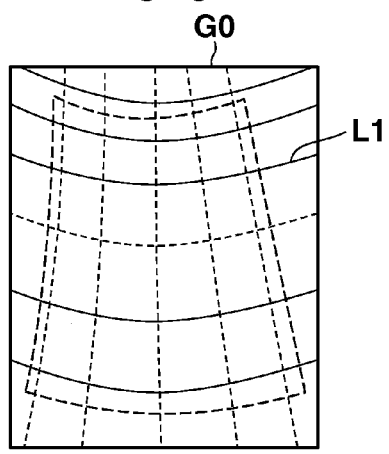

Then, the controlling unit 11 uses the angles indicating the local character string directions at the lattice points P set at step SA5 to set in the manuscript image G0 plural first configuration lines L1 passing through the division points N on the second configuration line L2 (the reference line), as shown in FIG. 6E (step SA11). The specific method of setting the plural first configuration lines L1 is substantially the same as setting the first configuration line L1 as the reference line at step SA7.

Figure 6F:
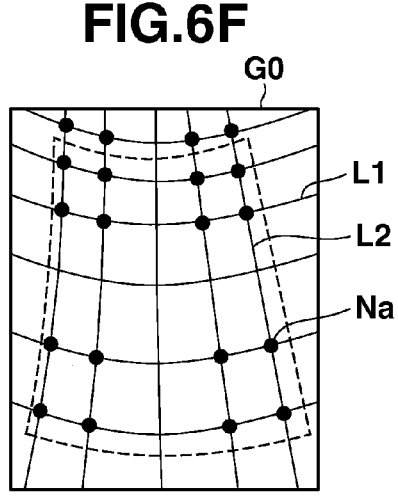

When the above processes finish, a grid consisting of plural first configuration lines L1 and plural second configuration lines L2 will have been set in the manuscript image G0, as shown in FIG. 6F.

Further, the controlling unit 11 obtains coordinates of intersection points Na (indicated by black circles in FIG. 6F) other than the division points N, from among the intersection points (lattice points of the grid) of the plural first configuration lines L1 and the plural second configuration lines L2 set in the manuscript image G0 (step SA12).

Figure 7A:
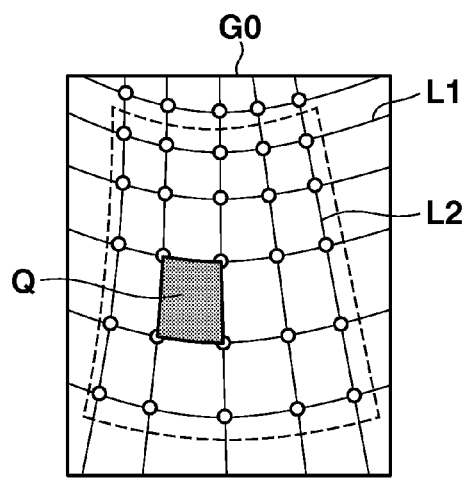
FIG. 7A, FIG. 7B, and FIG. 7C are views showing contents of the image correction process performed in the first embodiment of the invention.

Thereafter, the controlling unit 11 successively cuts out a rectangle area defined by four adjacent intersection points from the manuscript image G0 as an area to be processed. The rectangle area corresponds to a unit area in the present embodiment. The rectangle area is subjected to a projective transformation and transformed to a square image having a prescribed longitudinal and lateral sizes (step SA13). FIG. 7A is a view showing the division points N, intersection points Na (white circles), and the rectangle area Q.

The longitudinal and lateral sizes of the transformed square image correspond to the division distances by which the first configuration line L1 is divided into the plural sections in the dividing process at step SA8 (FIG. 4), that is, correspond to the width "w" and height "h" defined in the three-dimensional space, respectively.

Figure 7B:
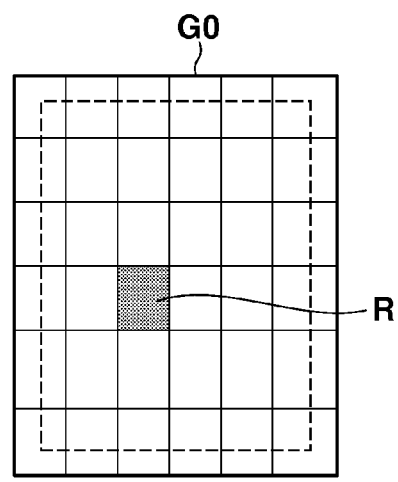

The controlling unit 11 connects the images of the transformed rectangle areas to each other, in other words, connects a square image to other transformed square images stored in the memory with their original positional relationship between them maintained (step SA14). FIG. 7B is a view showing the transformed square image R corresponding to the rectangle area Q shown in FIG. 7A and their connected positions.

Further, the controlling unit 11 repeatedly performs the processes at step SA13 and at step SA14 until the process has been performed on all lattice points (all the rectangle areas) spread over the whole image (NO at step SA15).

When all the lattice points (all the rectangle areas) on the whole image have been processed (YES at step SA15), the controlling unit 11 stores in the work memory 13b an image consisting of all the square images connected to each other and having the same longitudinal and lateral sizes as the manuscript image as a corrected image.

Figure 7C:
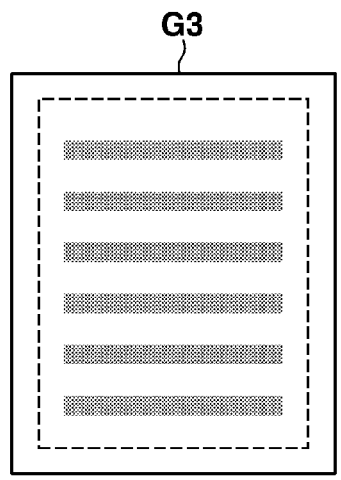

The above processes have been performed to correct distortion involved in the image photographed by the camera 3a, providing a corrected image G3 with manuscript distortion corrected or removed, as shown in FIG. 7C.

Data of the corrected image stored in the work memory 13b is displayed on the displaying panel 15a and also sent through the communication unit 16 to other apparatus such as personal computers to be stored therein.

The lattice points (division points N and intersection points Na) of the grid which are set in the manuscript image G0 in the image correction process are directly reflected by relationship in position (distances) between the lattice points on the manuscript in the three-dimensional space, that is, by distortions appearing at several parts of the manuscript in the three dimensional space.

The image correction apparatus 1 can be obtain a corrected image representing an original manuscript with distortions corrected or removed in a high accuracy, from a manuscript image produced by photographing a manuscript which is generally curved and/or from a manuscript image produced by photographing a manuscript which includes local distortions at arbitrary parts such as its frame portion and/or corners. In short, a corrected image can be obtained, representing character information in good condition similar to the image obtained from the manuscript which is not curved or contains no partial distortions.

Further, in the image correction process, not only the distortion of the curved manuscript and local distortions in the manuscript but also a trapezoidal distortion of an image produced by photographing a manuscript from diagonally can be corrected simultaneously, that is, at one time.

In the image correction process, when the first configuration lines L1 and the second configuration lines L2 are divided into plural sections separated at even intervals in the three-dimensional space, the distance of the small section A-B in the three-dimensional space is obtained on the assumption that points on the manuscript will move on the curved surface of the manuscript in the specific direction (or in the direction parallel to the vertical place S).

Therefore, even in the process based on only the manuscript image, the first configuration lines L1 and the second configuration lines L2 can be divided accurately at even intervals in the three-dimensional space, and the grid can be set in the manuscript image, which grid has the intersection points accurately reflected by distortions at various positions on the manuscript in the three-dimensional space, whereby a corrected image representing character information in good condition can be obtained.

The first configuration lines L1 and the second configuration lines L2 included in the grid are set based on the character string directions and the character line directions detected from the binarized image G1, whereby a corrected image representing character information in good condition can be obtained.

In the above description of the present embodiment of the invention, the method of detecting the character string directions and the character line directions has been described as one example but can be modified and/or rearranged. For example, contour extraction is made in the manuscript image and the character string directions and the character line directions can be detected based on the detected contour information.

Second Embodiment

The second embodiment of the present invention will be described. The image correction apparatus according to the second embodiment of the present invention has the external appearance as shown in FIG. 1 and the internal configuration as shown in FIG. 2. In accordance with a program stored in the storing unit 13, the controlling unit 11 performs an image correction process, which is different from the first embodiment.

The second embodiment will be outlined first. In the image correction process, the controlling unit 11 sets plural second configuration lines L2 indicating character line directions on the manuscript image, without detecting the character line direction from the binarized image G1.

Figure 11:
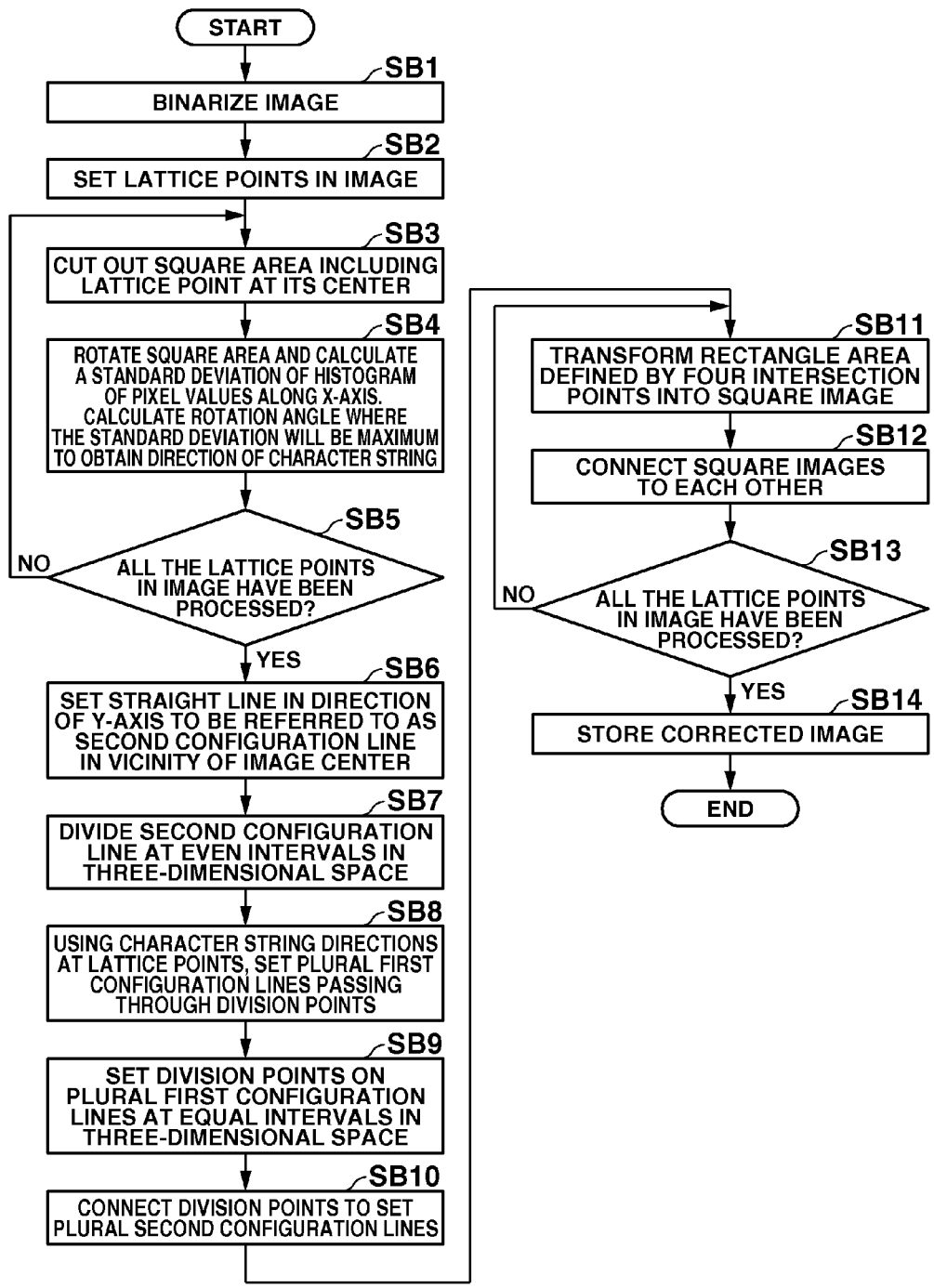
FIG. 11 is a flow chart of an image correction process performed by the controlling unit 11 in the second embodiment.

FIG. 11 is a flow chart of the image correction process to be performed by the controlling unit 11 in the second embodiment.

In the second embodiment, the controlling unit 11 binarizes the manuscript image of the photographed manuscript (step SB1), sets lattice points at plural positions on the binarized image G1 (step SB2), successively cuts out a square area image of a given size and having the lattice point P at its center from the binarized image G1 (step SB3), and then detects the local character string direction at each lattice point (step SB4).

The above processes are substantially the same as the processes at steps SA1 to SA4 in FIG. 3, respectively (Refer to FIG. 5A to FIG. 5D).

Then, the controlling unit 11 repeatedly performs the processes at steps SB1 to SB4 (NO at step SB5) until the character string directions have been obtained at all lattice points. When the character string directions (angles) have been obtained at all lattice points (YES at step SB5), the controlling unit 11 performs the following process.

Figure 12A:
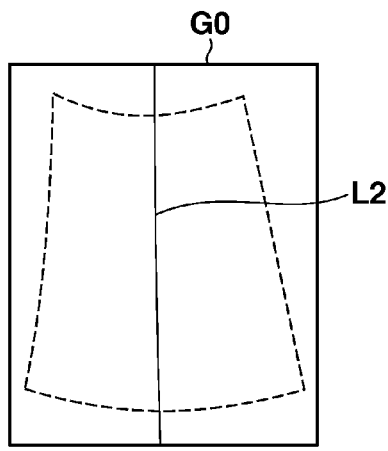
FIG. 12A, FIG. 12B, FIG. 12C, FIG. 12D, FIG. 12E, and FIG. 12F are views showing contents of the image correction process performed in the second embodiment of the invention.

The controlling unit 11 sets a straight line in the direction of y-axis as shown in FIG. 12A as the second configuration line L2 to be referred to as the reference at the center of the manuscript image G0 (step SB6). The reason why the second configuration line L2 to be referred as the reference is set as the straight line is in that linearity seems to be maintained in the character line direction in the vicinity of the center of the lateral direction (direction of x-axis), even if the manuscript is curved and/or local distortions appear in the manuscript.

Then, the controlling unit 11 divides the second configuration line L2 to be used as the reference into plural sections separated at even intervals in the three-dimensional space, and sets division points (step SB7).

Figure 12B:
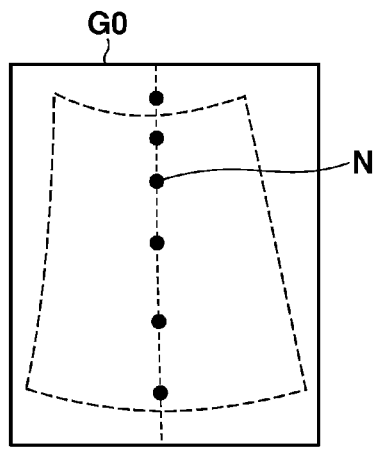

More specifically, the controlling unit 11 sets a starting point at the center of the manuscript image G0, and successively sets plural division points N separated from each other by given division distances respectively along one side and other side directions from the starting point on the second configuration line L2, as shown in FIG. 12B, and stores the coordinates of the division points.

When setting the plural division points, the controlling unit 11 successively sets a small section having a starting point and a terminal point at two adjacent points on the second configuration line L2 in a similar manner to the dividing process (FIG. 4) described in the first embodiment, and repeatedly obtains the distance of the small section in the three-dimensional space, thereby successively setting the plural division points N.

On the assumption that the longitudinal direction of the manuscript is in the direction of x-axis and the lateral direction is in the direction of y-axis (Refer to FIG. 9A), and the second configuration line L2 is in the vertical plane perpendicular to the x- and y-axes, the distance to be obtained in the three-dimensional space corresponds to a distance between two points in the vertical plane.

Figure 12C:
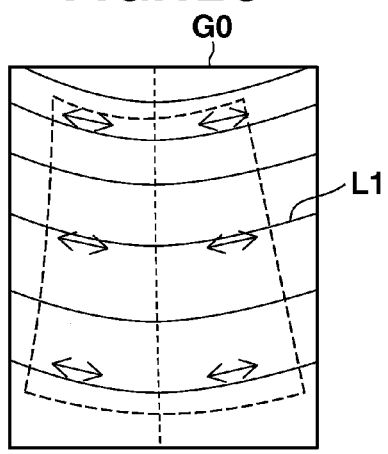

Then, using the character string directions at the lattice points P obtained at step SB4, the controlling unit 11 sets plural first configuration lines L1 passing through the division points N on the second configuration line L2 on the manuscript image G0, as shown in FIG. 12C (step SB8).

When setting the plural first configuration lines L1 on the manuscript image G0, the controlling unit 11 complements the character string directions (angles) at points between the lattice points P based on the local character string directions (angles) at the respective lattice points P, in the same manner as setting the first configuration line L1 in the first embodiment, and repeatedly extends a line section by a small distance both on one side and the other side from the respective division points N on the second configuration line L2 toward the character line directions at the points, thereby setting plural first configuration lines L1.

Then, using as the reference the division points N which are set on the second configuration line L2 at step SB7, the controlling unit 11 divides the plural first configuration lines L1 into plural sections separated at even intervals in the three-dimensional space, and sets the division points (step SB9).

Figure 12D:
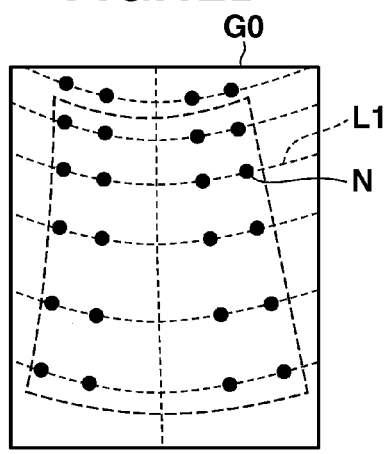

When setting the division points, using the division points N set on the second configuration line L2 as the starting points, the controlling unit 11 successively sets plural division points N separated by given division distance on one side and the other side on the plural first configuration lines L1 in the three-dimensional space, as shown in FIG. 12D, and stores the coordinates of the plural division points. The process at step SB9 is performed in a similar manner to the dividing process performed in the first embodiment (FIG. 4).

Figure 12E:
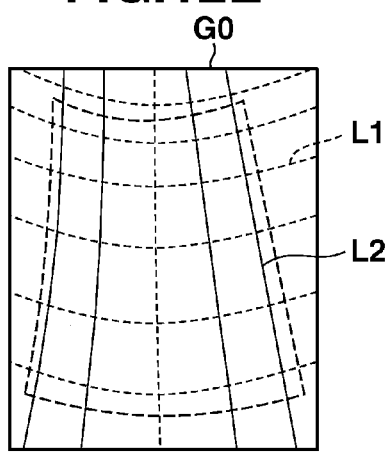

Then, the controlling unit 11 connects the division points N set on the plural first configuration lines L1 in the direction of y-axis, thereby setting plural second configuration lines L2 in the manuscript image G0, as shown in FIG. 12E (step SB10). More specifically, the controlling unit 11 selects and connects the division points on the plural first configuration lines L1 which are separated by the same distance from the second configuration line set as the reference in the three-dimensional space from among those on the plural first configuration lines L1, thereby producing the plural new second configuration lines.

Figure 12F:
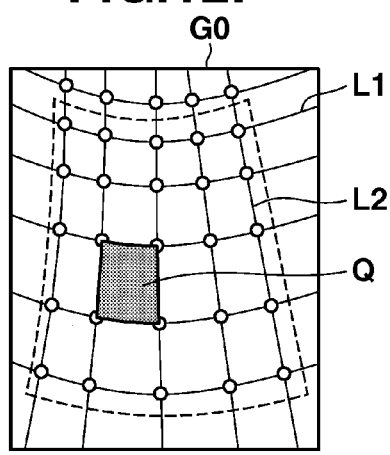

When the above processes have been performed, a grid consisting of the plural first configuration lines L1 and the plural second configuration lines L2 will be set in the manuscript image G0 as shown in FIG. 12F.

Thereafter, the controlling unit 11 performs substantially the same processes as those at steps SA13 to SA16 in FIG. 3.

Confirming the coordinates of the intersection points of the plural first configuration lines and the plural second configuration lines as the division points N, the controlling unit 11 successively cuts out a rectangle area defined by the four division points from the manuscript image G0 as an area image to be processed, and performs the projective transformation on the rectangle area to obtain a square image having a predetermined longitudinal and lateral sizes (step SB11). FIG. 12F is a view showing the intersection points (white circles), and one rectangle area Q.

The longitudinal and lateral sizes of the transformed square image correspond respectively to the division distance by which the second configuration line L2 used as the reference is divided into the plural sections in the process at step SB7 and to the division distance by which the plural first configuration lines L1 are divided into the plural sections in the process at step SB9, that is, correspond to the width "w" and height "h" defined in the three-dimensional space, respectively.

Thereafter, the controlling unit 11 connects one by one the image of the transformed rectangle areas (square area images) to the other transferred square area image stored in the memory with their original relationship in position between them maintained (step SB12). Until all the square area images have been processed (NO at step SB13), the processes at steps SB11 and SB12 are repeatedly performed.

When all the lattice points on the whole image have been processed (YES at step SB13), the controlling unit 11 stores in the work memory 13b an image consisting of all the square area images connected to each other and having the same longitudinal and lateral sizes as the manuscript image G0 as a corrected image.

In the similar manner to the first embodiment, the above processes performed in the second embodiment will provide the corrected image G3 with manuscript distortion corrected or removed, as shown in FIG. 7C.

In the second embodiment, the lattice points (division points N) of the grid which are set in the manuscript image G0 in the image correction process are also reflected by the relationship in position (distances) between the lattice points on the manuscript in the three-dimensional space, that is, by distortions appearing at several parts of the manuscript in the three dimensional space. Accordingly, the same effect can be expected as described in the first embodiment from the same reason.

Further in the second embodiment, effects different from the first embodiment can be obtained. That is, in the first embodiment, the character line direction is detected from the binarized image G1 (area image G2) but the accuracy of detecting the character line direction depends greatly on a character size in the manuscript. For example, if the characters in the manuscript is Japanese, since the Japanese character line direction as image information does not occur clearly as an alphabetical character line direction, the accuracy of detecting the Japanese character line direction will be poor.

The lower the image resolution is, the lower the accuracy of detecting the character line direction will be. In particular, when the angle (angle for taking a picture) between the optical axis of the camera 3a and the manuscript is small, since the image resolution at a part far from the camera 3a will be lower than at a part close to the camera 3a, the accuracy of detecting an image will remarkably be low. Therefore, there is a natural limit to the accuracy of the plural second configuration lines which are set in the manuscript image G0 based on the character line directions, that is, to the accuracy of the grid to beset in the manuscript image G0.

On the contrary, in the second embodiment of the invention, the controlling unit 11 indirectly determines the plural second configuration lines L2 based on the plural first configuration lines L1 indicating character line directions and sets them the on the manuscript image G0. Therefore, even though the characters of the manuscript are written in Japanese, the controlling unit 11 can set in the manuscript image G0 the grid having the lattice points which is more accurately reflected by relationship in position among points spread over the manuscript in the three-dimensional space. Further, the controlling unit 11 can reflect the relationship in position among the points spread over the manuscript in the three-dimensional space to the whole grid with a constant accuracy.

In the second embodiment, even when the character line directions of the characters in the manuscript do not appear remarkably as image information as in the case of Japanese characters in contradiction to the case of Alphabet characters, the controlling unit 11 can obtain a corrected image representing the character information in good condition.

In the description of the first and the second embodiments, the grid consisting of the first configuration lines L1 and the second configuration lines L2 has been set in the manuscript image G0, and then the rectangle areas Q defined by four intersection points in the grid are subjected to the projective transformation, whereby the square area images having a prescribed longitudinal and lateral sizes are obtained. Then, the obtained square area images are connected to each other, whereby a corrected image G3 is obtained.

But, when the present invention is put into practice, for example, after the grid has been set in the manuscript image G0, it is possible to perform non-linear image transformation (Mesh warping) using Morphing technique to change the rectangle areas Q into the square area images, thereby generating the corrected image G3. In other words, a mapping function is determined, which transforms the positions of the lattice points of the grid to the positions of the lattice points of a normal grid to be attained, and it is possible to use the mapping function to generate the corrected image G3 from the manuscript image G0.

When the above image transformation is performed, concerning an area where the lattice points are disposes at even distances in the longitudinal and lateral directions on the manuscript image G0, it is possible to generate a corrected image G3, even if the image transformation is performed without using the lattice points falling into said area. Therefore, it is possible to effectively generate the corrected image G3 by using the minimum number of lattice points necessary for performing the above image transformation.

In the description of the first and the second embodiments, the grid consisting of the first configuration lines L1 and the second configuration lines L2 has been set in the manuscript image G0, and then the manuscript image G0 is corrected, whereby the corrected image G3 is obtained finally. But when the present invention is put into practice, it is possible to set the grid on the binarized image G1 and correct the binarized image G1 to obtain the corrected image G3 finally.

In the description of the first and the second embodiments, the manuscript is document, that is, the manuscript is paper medium. But the manuscript can be medium indicating information, composed of synthetic resins and metals other than paper. The information printed and/or written on the surface of the manuscript can be not only characters but also figures and patterns, as far as they are regularly disposed.

Although the specific embodiment and modified embodiment of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. An image correction apparatus for correcting distortion of an image, the image being obtained by photographing a subject, the apparatus comprising:
    a camera which photographs the subject to obtain the image; and
    a control unit which comprises a CPU that is configured to:
        specify a relationship in position between points on the subject in a three-dimensional space based on both a relationship in position between the points on the subject in the image in a two-dimensional space and a photographing angle relative to a surface of the subject;
        obtain information of distortion of the image that is reflected by the specified relationship in position between the points on the subject in the three-dimensional space; and
        correct the distortion of the image based on the obtained information of distortion of the image,
    wherein the subject is paper on which at least one of characters and a figure are drawn and wherein when the subject has a flat surface in a normal state, the image of the subject has not been made distorted,
    wherein configuration lines are set on the image respectively in a character string direction and in a character line direction in consideration of a feature of character strings in the image of the flat surface of the subject,
    wherein plural small sections are set on the image based on a relationship between the configuration lines set in the character string direction and in the character line direction and based on an assumption of moving directions of the configuration lines in the three-dimensional space,
    wherein information representing distortion of each of the plural small sections is specified, and
    wherein the plural small sections are changed based on the specified information representing the distortion of each of the plural small sections, thereby correcting the distortion of the image.

2. The image correction apparatus according to claim 1, wherein the CPU is further configured to specify the relationship in position between the points in the image in the three-dimensional space, based on the assumption that the points on the subject move in specific directions in the three-dimensional space when the surface of the subject is curved.

3. The image correction apparatus according to claim 2, wherein the CPU is further configured to:
    specify the relationship in position between the points in the image in the three-dimensional space by a distance between the points in the three-dimensional space; and
    obtain coordinate positions of plural attention-points in the image as information of distortion, said plural attention-points having the specified relationship in position reflected by the distance between two points in the three-dimensional space.

4. The image correction apparatus according to claim 2, wherein the CPU is further configured to specify the relationship in position between the points on the subject in the three-dimensional space, based on the assumption that the relationship in position between the points on the subject is known, and when there is a discrepancy between an estimated relationship in position estimated as a relationship in position between the points on the subject in an image in the two-dimensional space, wherein the image is obtained when the subject kept in a not curved state is photographed from diagonally at a prescribed angle, and a real relationship in position between the points on the subject in an image in the two-dimensional space, wherein the image is obtained by actually photographing the subject, and said discrepancy between the estimated relationship in position and the real relationship in position has been caused by the movement of the points in the specific directions.

5. The image correction apparatus according to claim 4, wherein the points on the subject whose relationship in position is known are plural points on a first straight line in the character string direction on the subject, and
    wherein the CPU is further configured to obtain coordinate positions of plural attention-points on a first configuration line on the image as the information of distortion, wherein the first configuration line corresponds to the first straight line.

6. The image correction apparatus according to claim 5, wherein the CPU is further configured to:
    detect directions of character strings at plural positions in the image, secure conformity in the detected directions of character strings to obtain a configuration line, and set the obtained configuration line as the first configuration line in the image, and
    obtain, as the information of distortion, the first set configuration line and coordinate positions of the plural attention-points set at equal intervals on the first set configuration line in a three-dimensional space.

7. The image correction apparatus according to claim 6, wherein the CPU is further configured to:
    set plural first configuration lines in the image, wherein the plural first configuration lines correspond respectively to plural first straight lines which are parallel to each other on the subject, and specify a relationship in position between points on each of the configuration lines in the three-dimensional space, and
    obtain, as the information of distortion, the set plural first configuration lines and coordinate positions of the plural attention-points respectively on the plural first configuration lines.

8. The image correction apparatus according to claim 7, wherein the CPU is further configured to:
    set plural second configuration lines in the image, which lines correspond respectively to plural second straight lines parallel to each other and crossing with the plural first straight lines at right angles on the subject, and further cross with the plural first configuration lines at the plural attention-points, and
    obtain the plural second configuration lines as the information of distortion.

9. The image correction apparatus according to claim 8, wherein the CPU is further configured to perform projective transformation to transform a shape of each of plural unit areas corresponding to the plural small sections into a square area, wherein the unit areas are defined by the plural first configuration lines and the plural second configuration lines, thereby correcting distortion of the image.

10. The image correction apparatus according to claim 9, wherein the CPU is further configured to connect the unit areas subjected to the projective transformation and transformed into square areas to each other, thereby generating a distortion-corrected image.

11. The image correction apparatus according to claim 8, wherein the CPU is further configured to detect plural positions in the image where directions of character lines cross with the directions of the character strings at right angles on the subject, and secure conformity in the directions of character lines at the detected plural positions to obtain a configuration line, thereby setting the obtained configuration line as a second configuration line in the image.

12. The image correction apparatus according to claim 8, wherein the CPU is further configured to:
set the first configuration line as a reference line in the image,
set plural division points on the first configuration line set as the reference line at equal intervals in the three-dimensional space, based on a distance between two adjacent points specified on the first configuration line in the three-dimensional space,
set plural configuration lines in directions of character lines crossing with the first configuration line set as the reference line at the plural division points, as the plural second configuration lines,
set plural division points on a second configuration line set as a reference line from among the plural second configuration lines at equal intervals in the three-dimensional space, based on a distance between two adjacent points specified on said second configuration line in the three-dimensional space, and
set plural configuration lines in the directions of character strings crossing with the plural second configuration lines at the plural division points on the second configuration line set as the reference line, as other first configuration lines, and
obtain coordinate positions of all the points where the plural first configuration lines intersect with the plural second configuration lines, including the plural division points, as the information of distortion.

13. The image correction apparatus according to claim 8, wherein the CPU is further configured to:
set a configuration line corresponding to a second straight line crossing with the first straight line at right angles on the subject as a second configuration line to be used as a reference line in the image in a direction of a character line crossing with a character string at right angles in a manuscript,
set plural division points at equal intervals on the second configuration line set as the reference line in the three-dimensional space, based on a distance between two adjacent points specified on the second configuration line in the three-dimensional space
set plural configuration lines in the directions of character strings crossing with the second configuration line set as the reference line at the plural division points, as the plural first configuration lines,
set plural division points on the plural first configuration lines at equal intervals in the three-dimensional space, based on a distance between two adjacent points specified on said first configuration lines in the three-dimensional space,
set plural configuration lines in directions of character lines crossing with the plural first configuration lines at the plural division points on the plural first configuration lines, as other second configuration lines, and
obtain coordinate positions of all the plural set division points, as the information of distortion.

14. The image correction apparatus according to claim 5, wherein the CPU is further configured to perform an image process on the image based on the information of distortion to correct a distance between two points among the plural attention-points on the first configuration line to a distance on the subject in the two-dimensional space and also to correct the first configuration line to a straight line, thereby correcting distortion of the image to correct distortion of the subject.

15. The image correction apparatus according to claim 1, wherein when distortion of the image which has been obtained by obliquely photographing the flat portion of the subject is to be corrected, the CPU is configured to:
specify a photographing angle to the flat portion of the subject,
specify the relationship in position between points on the subject with distortion in the three-dimensional space based on the relationship in position between imaginary points defining the plural small sections on the flat portion of the subject with no distortion in the two-dimensional space, the relationship in position between the imaginary points defining the plural small sections on the image of the distorted flat portion of the subject in the two-dimensional space, and the specified photographing angle, and
correct the distortion of the image based on the specified relationship in position between points on the subject with distortion in the three-dimensional space, thereby correcting the distortion of the flat portion of the subject.

16. A method of correcting distortion of an image, the image being obtained by photographing a subject, wherein the subject is paper on which at least one of characters and a figure are drawn and wherein when the subject has a flat surface in a normal state, the image of the subject has not been made distorted, the method comprising:
specifying a relationship in position between points on the subject in a three-dimensional space, based on both a relationship in position between the points on the subject in the image in a two-dimensional space and a photographing angle relative to a surface of the subject;
obtaining information of distortion of the image that is reflected by the specified relationship in position between the points on the subject in the three-dimensional space; and
correcting the distortion of the image based on the obtained information of distortion of the image,
wherein configuration lines are set on the image respectively in a character string direction and in a character line direction in consideration of a feature of character strings in the image of the flat surface of the subject,
wherein plural small sections are set on the image based on a relationship between the configuration lines set in the character string direction and in the character line direction and based on an assumption of moving directions of the configuration lines in the three-dimensional space, wherein information representing distortion of each of the plural small sections is specified, and wherein the plural small sections are changed based on the specified information representing the distortion of each of the plural small sections, thereby correcting the distortion of the image.

17. A non-transitory computer-readable storage medium with an executable program stored thereon for a computer of an image correction apparatus for correcting distortion of an image, the image being obtained by photographing a subject, wherein the subject is paper on which at least one of characters and a figure are drawn and wherein when the subject has a flat surface in a normal state, the image of the subject has not been made distorted, the program causing the computer to perform functions comprising:

specifying a relationship in position between points on the subject in a three-dimensional space based on both a relationship in position between the points on the subject in the image in a two-dimensional space and a photographing angle relative to a surface of the subject;

obtaining information of distortion of the image that is reflected by the specified relationship in position between the points on the subject in the three-dimensional space; and correcting the distortion of the image based on the obtained information of distortion of the image, wherein configuration lines are set on the image respectively in a character string direction and in a character line direction in consideration of a feature of character strings in the image of the flat surface of the subject, wherein plural small sections are set on the image based on a relationship between the configuration lines set in the character string direction and in the character line direction and based on an assumption of moving directions of the configuration lines in the three-dimensional space, wherein information representing distortion of each of the plural small sections is specified, and wherein the plural small sections are changed based on the specified information representing the distortion of each of the plural small sections, thereby correcting the distortion of the image.

\* \* \* \* \*